US010029230B1

(12) United States Patent
Kufeld et al.

(10) Patent No.: US 10,029,230 B1
(45) Date of Patent: Jul. 24, 2018

(54) FLOW IN A SLURRY LOOP REACTOR

(71) Applicant: Chevron Phillips Chemical Company LP, The Woodlands, TX (US)

(72) Inventors: Scott E Kufeld, Houston, TX (US); John D Hottovy, Porter, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/413,868

(22) Filed: Jan. 24, 2017

(51) Int. Cl.
| | |
|---|---|
| *B01J 19/24* | (2006.01) |
| *C08F 10/00* | (2006.01) |
| *C08F 2/01* | (2006.01) |
| *C08F 2/14* | (2006.01) |
| *B01J 19/00* | (2006.01) |
| *B01J 19/18* | (2006.01) |

(52) U.S. Cl.
CPC ....... *B01J 19/2435* (2013.01); *B01J 19/0013* (2013.01); *C08F 2/01* (2013.01); *C08F 10/00* (2013.01); *B01J 2219/00094* (2013.01); *B01J 2219/00162* (2013.01)

(58) Field of Classification Search
CPC ...... C08F 2/14; C08F 2400/02; B01J 19/1837
USPC .......................................... 526/64; 422/132
See application file for complete search history.

(56) References Cited

U.S. PATENT DOCUMENTS

| | | | |
|---|---|---|---|
| 1,693,786 | A | 12/1928 | Isaachsen |
| 2,770,295 | A | 11/1956 | Allen |
| 2,825,721 | A | 3/1958 | Hogan et al. |
| 2,915,513 | A | 12/1959 | Leatherman et al. |
| 2,943,082 | A | 6/1960 | Cottle |
| 2,951,067 | A | 8/1960 | Cash |
| 2,952,671 | A | 9/1960 | Cottle |
| 2,982,763 | A | 5/1961 | McLeod |
| 2,988,527 | A | 6/1961 | Tegge |
| 3,001,978 | A | 9/1961 | McLeod |
| 3,126,365 | A | 3/1964 | Hooker |
| 3,152,872 | A | 10/1964 | Scoggin et al. |

(Continued)

FOREIGN PATENT DOCUMENTS

| | | |
|---|---|---|
| AT | 353479 B | 11/1979 |
| BE | 695770 A | 9/1967 |

(Continued)

OTHER PUBLICATIONS

Mirzae, A., et al, "Prepolymerization of Ethylene with a Ziegler-Natta Catalyst," Journal of Applied Polymer Science, May 14, 2007, pp. 2703-2711, vol. 105, Wiley Periodicals, Inc.

(Continued)

*Primary Examiner* — Fred M Teskin
(74) *Attorney, Agent, or Firm* — Conley Rose, P.C.; Rodney B. Carroll; Monte R. Rhodes

(57) ABSTRACT

Olefin polymerization processes are described herein. The processes generally include circulating a slurry including an olefin monomer selected from $C_2$-$C_{12}$ olefin monomers, a liquid diluent selected from $C_3$-$C_7$ alkanes, catalyst and polyolefin particles under polymerization conditions within a loop reactor. In one or more specific embodiments, in operation, the process has a cavitation number of from 6 to 60 and the polymerization conditions include a polymerization temperature of from 38° C. to 121° C. and a polymerization pressure of from 27 bar to 50 bar. In other embodiments, the process has a Euler Number (Eu) of at least 5.

26 Claims, 1 Drawing Sheet

(56) References Cited

U.S. PATENT DOCUMENTS

| | | |
|---|---|---|
| 3,172,737 A | 3/1965 | Whittington |
| 3,203,766 A | 8/1965 | Mudd et al. |
| 3,242,150 A | 3/1966 | Scoggin |
| 3,248,179 A | 4/1966 | Norwood |
| 3,257,363 A | 6/1966 | Miller et al. |
| 3,262,922 A | 7/1966 | Payne |
| 3,285,899 A | 11/1966 | Houser et al. |
| 3,293,000 A | 12/1966 | Marwil |
| 3,309,350 A | 3/1967 | Kelley et al. |
| 3,318,857 A | 5/1967 | Dietz |
| 3,324,093 A | 6/1967 | Alleman |
| 3,418,305 A | 12/1968 | Payne et al. |
| 3,551,403 A | 12/1970 | Delbouille et al. |
| 3,594,356 A | 7/1971 | Hinton |
| 3,625,658 A | 12/1971 | Closon |
| 3,640,980 A | 2/1972 | Baba |
| 3,642,731 A | 2/1972 | Tegge et al. |
| 3,794,627 A | 2/1974 | Giachetto |
| 3,816,383 A | 6/1974 | Stotko |
| 3,858,943 A | 1/1975 | Bose et al. |
| 3,879,361 A | 4/1975 | Wyatt et al. |
| 3,912,701 A | 10/1975 | Dunn, Jr. |
| 3,956,061 A | 5/1976 | Young et al. |
| 3,956,257 A | 5/1976 | Hogan |
| 4,007,321 A | 2/1977 | Scholz et al. |
| 4,099,335 A | 7/1978 | Jezl et al. |
| 4,121,029 A | 10/1978 | Irvin et al. |
| 4,126,743 A | 11/1978 | Shiomura et al. |
| 4,199,546 A | 4/1980 | Kirch |
| 4,211,863 A | 7/1980 | McDaniel et al. |
| 4,258,158 A | 3/1981 | Pfeiffer |
| 4,372,758 A | 2/1983 | Bobst et al. |
| 4,383,972 A | 5/1983 | McCurdy et al. |
| 4,395,523 A | 7/1983 | Kirch |
| 4,424,341 A | 1/1984 | Hanson et al. |
| 4,436,902 A | 3/1984 | Wood et al. |
| 4,439,601 A | 3/1984 | McCurdy et al. |
| 4,461,889 A | 7/1984 | Hanson |
| 4,499,263 A | 2/1985 | Messura et al. |
| 4,501,885 A | 2/1985 | Sherk et al. |
| 4,528,337 A | 7/1985 | Kreilein et al. |
| 4,543,399 A | 9/1985 | Jenkins, III et al. |
| 4,589,957 A | 5/1986 | Sherk et al. |
| 4,613,484 A | 9/1986 | Ayres et al. |
| 4,632,976 A | 12/1986 | Asanuma et al. |
| 4,654,801 A | 3/1987 | Stewart et al. |
| 4,674,290 A | 6/1987 | Verser |
| 4,676,870 A | 6/1987 | Stewart et al. |
| 4,690,804 A | 9/1987 | Rohlfing |
| 4,737,280 A | 4/1988 | Hanson |
| 4,740,550 A | 4/1988 | Foster |
| 4,754,007 A | 6/1988 | Pullukat et al. |
| 4,794,151 A | 12/1988 | Mueller-Mall et al. |
| 4,832,915 A | 5/1989 | Messura et al. |
| 5,183,866 A | 2/1993 | Hottovy |
| 5,207,929 A | 5/1993 | Sung et al. |
| 5,225,465 A | 7/1993 | Eichenauer et al. |
| 5,272,236 A | 12/1993 | Lai et al. |
| 5,276,115 A | 1/1994 | Bohmer et al. |
| 5,278,272 A | 1/1994 | Lai et al. |
| 5,292,863 A | 3/1994 | Wang |
| 5,314,579 A | 5/1994 | Sung |
| 5,326,835 A | 7/1994 | Ahvenainen et al. |
| 5,371,158 A | 12/1994 | Brekner et al. |
| 5,387,659 A | 2/1995 | Hottovy et al. |
| 5,391,654 A | 2/1995 | Ahvenainen et al. |
| 5,416,179 A | 5/1995 | Welch et al. |
| 5,455,314 A | 10/1995 | Burns et al. |
| 5,473,020 A | 12/1995 | Peifer et al. |
| 5,480,948 A | 1/1996 | Geerts |
| 5,492,985 A | 2/1996 | Peifer et al. |
| 5,565,174 A | 10/1996 | Burns et al. |
| 5,565,175 A | 10/1996 | Hottovy et al. |
| 5,575,979 A | 11/1996 | Hanson |
| 5,597,892 A | 1/1997 | Hanson |
| 5,638,834 A | 6/1997 | White et al. |
| 5,639,834 A | 6/1997 | Debras et al. |
| 5,712,365 A | 1/1998 | Arai et al. |
| 5,744,555 A | 4/1998 | Ames et al. |
| 5,747,407 A | 5/1998 | Martin |
| 5,898,053 A | 4/1999 | Leaney et al. |
| 5,959,044 A | 9/1999 | Villar |
| 5,986,021 A | 11/1999 | Hokkanen et al. |
| 6,042,790 A | 3/2000 | Hottovy et al. |
| 6,045,661 A | 4/2000 | Kreischer et al. |
| 6,051,631 A | 4/2000 | Hottovy |
| 6,114,501 A | 9/2000 | Hottovy et al. |
| 6,204,344 B1 | 3/2001 | Kendrick et al. |
| 6,225,421 B1 | 5/2001 | Promel et al. |
| 6,225,422 B1 | 5/2001 | Power et al. |
| 6,239,235 B1 | 5/2001 | Hottovy et al. |
| 6,239,300 B1 | 5/2001 | Stouffer et al. |
| 6,262,191 B1 | 7/2001 | Hottovy et al. |
| 6,281,300 B1 | 8/2001 | Kendrick |
| 6,319,997 B1 | 11/2001 | Kendrick et al. |
| 6,355,741 B1 | 3/2002 | Marechal |
| 6,380,325 B1 | 4/2002 | Kendrick |
| 6,533,988 B2 | 3/2003 | Kallio et al. |
| 6,566,460 B1 | 5/2003 | Salmon |
| 6,699,947 B1 | 3/2004 | Evertz et al. |
| 6,743,869 B2 | 6/2004 | Franklin, III et al. |
| 6,806,324 B2 | 10/2004 | Hottovy et al. |
| 6,815,511 B2 | 11/2004 | Verser et al. |
| 6,833,415 B2 | 12/2004 | Kendrick et al. |
| 6,858,682 B2 | 2/2005 | Kendrick et al. |
| 6,926,868 B2 | 8/2005 | Kendrick et al. |
| 6,967,230 B2 | 11/2005 | Hottovy et al. |
| 7,005,485 B2 | 2/2006 | Burns et al. |
| 7,014,821 B2 | 3/2006 | Hottovy et al. |
| 7,015,289 B2 | 3/2006 | Hottovy et al. |
| 7,033,545 B2 | 4/2006 | Kufeld et al. |
| 7,034,090 B2 | 4/2006 | Kendrick |
| 7,037,980 B2 | 5/2006 | Stacy et al. |
| 7,109,290 B2 | 9/2006 | McElvain et al. |
| 7,179,426 B2 | 2/2007 | Hottovy et al. |
| 7,268,194 B2 | 9/2007 | Kendrick et al. |
| 7,517,947 B2 | 4/2009 | McElvain et al. |
| 7,524,904 B2 | 4/2009 | Verser et al. |
| 7,547,750 B2 | 6/2009 | McElvain et al. |
| 7,615,596 B2 | 11/2009 | Burns et al. |
| 7,645,841 B2 | 1/2010 | Shaw et al. |
| 7,718,732 B2 | 5/2010 | Lee et al. |
| 7,736,597 B2 | 6/2010 | Hottovy et al. |
| 7,957,947 B2 | 6/2011 | Odi |
| 7,999,044 B2 | 8/2011 | Hottovy et al. |
| 8,017,701 B2 | 9/2011 | McElvain et al. |
| 8,058,367 B2 | 11/2011 | Hottovy et al. |
| 8,202,949 B2 | 6/2012 | McElvain et al. |
| 8,344,078 B2 | 1/2013 | Hottovy |
| 8,354,063 B2 | 1/2013 | Hottovy et al. |
| 8,871,886 B1 | 10/2014 | Hottovy et al. |
| 9,340,629 B2 | 5/2016 | Bhandarkar et al. |
| 9,358,515 B2 | 6/2016 | Hottovy et al. |
| 2001/0012497 A1 | 8/2001 | Debras |
| 2002/0086955 A1 | 7/2002 | Kendrick |
| 2002/0111441 A1 | 8/2002 | Kendrick et al. |
| 2002/0132936 A1 | 9/2002 | Kendrick et al. |
| 2002/0173598 A1 | 11/2002 | Kendrick et al. |
| 2002/0182121 A1 | 12/2002 | Kendrick |
| 2002/0187081 A1 | 12/2002 | Hottovy et al. |
| 2003/0012705 A1 | 1/2003 | Hottovy et al. |
| 2003/0023010 A1 | 1/2003 | Hottovy et al. |
| 2003/0027944 A1 | 2/2003 | Hottovy et al. |
| 2003/0050409 A1 | 3/2003 | Hottovy et al. |
| 2003/0083444 A1 | 5/2003 | McElvain et al. |
| 2003/0092856 A1 | 5/2003 | Hottovy et al. |
| 2003/0229187 A1 | 12/2003 | Kufeld et al. |
| 2004/0116625 A1 | 6/2004 | Hottovy et al. |
| 2004/0122187 A1 | 6/2004 | Verser et al. |
| 2004/0136881 A1 | 7/2004 | Verser et al. |
| 2004/0192860 A1 | 9/2004 | Hottovy et al. |
| 2005/0095176 A1 | 5/2005 | Hottovy |
| 2006/0063896 A1 | 3/2006 | McElvain et al. |
| 2006/0100591 A1 | 5/2006 | Alheidt et al. |

(56) References Cited

U.S. PATENT DOCUMENTS

| | | |
|---|---|---|
| 2006/0159595 A1 | 7/2006 | Hottovy et al. |
| 2008/0052058 A1 | 2/2008 | Odi |
| 2009/0124779 A1 | 5/2009 | Cousin et al. |
| 2009/0326168 A1 | 12/2009 | Burns et al. |
| 2010/0056707 A1 | 3/2010 | Hottovy et al. |
| 2010/0056732 A1 | 3/2010 | McElvain et al. |
| 2010/0130704 A1 | 5/2010 | Hottovy et al. |
| 2011/0288247 A1 | 11/2011 | Hottovy |
| 2015/0175721 A1 | 6/2015 | Hendrickson |

FOREIGN PATENT DOCUMENTS

| | | |
|---|---|---|
| BE | 865789 A | 7/1978 |
| CA | 857386 A | 12/1970 |
| CA | 1019899 A | 10/1977 |
| DE | 1800935 A1 | 5/1969 |
| EP | 0415427 A2 | 3/1991 |
| EP | 0416379 A2 | 3/1991 |
| EP | 0432555 A2 | 6/1991 |
| EP | 0519266 A1 | 12/1992 |
| EP | 0648697 A1 | 4/1995 |
| EP | 0891990 A2 | 1/1999 |
| EP | 0891990 A3 | 11/1999 |
| EP | 2055725 A1 | 5/2009 |
| FR | 647754 | 11/1928 |
| GB | 590595 A | 7/1947 |
| GB | 790547 A | 2/1958 |
| GB | 828791 A | 2/1960 |
| GB | 841263 A | 7/1960 |
| GB | 863055 A | 3/1961 |
| GB | 887707 A | 1/1962 |
| GB | 905879 A | 11/1962 |
| GB | 1147019 A | 4/1969 |
| GB | 1435965 A | 5/1976 |
| GB | 2018611 A | 10/1979 |
| JP | 52147689 A | 12/1977 |
| JP | 56093701 A | 7/1981 |
| JP | 58132009 A | 8/1983 |
| JP | 5949233 A | 3/1984 |
| JP | 61089211 A | 5/1986 |
| JP | 6213408 A | 1/1987 |
| JP | 62007704 A | 1/1987 |
| JP | 1178503 A | 7/1987 |
| JP | 62151412 A | 7/1987 |
| JP | 62164703 A | 7/1987 |
| JP | 56100632 A | 8/1987 |
| JP | 1139602 A | 6/1989 |
| JP | 1139603 A | 6/1989 |
| JP | 1178504 A | 7/1989 |
| JP | 3084014 A | 4/1991 |
| JP | 04230863 A | 8/1992 |
| JP | 6073168 A | 3/1994 |
| JP | 7286004 A | 10/1995 |
| JP | 2514386 B2 | 7/1996 |
| JP | 10087738 A | 4/1998 |
| JP | 10168115 A | 6/1998 |
| PL | 82848 A6 | 10/1975 |
| WO | 9308221 A2 | 4/1993 |
| WO | 9616996 A2 | 6/1996 |
| WO | 9618659 A1 | 6/1996 |
| WO | 9634895 A1 | 11/1996 |
| WO | 9736942 A1 | 10/1997 |
| WO | 9801477 A1 | 1/1998 |
| WO | 9947251 A1 | 9/1999 |
| WO | 9960028 A2 | 11/1999 |
| WO | 0002929 A1 | 1/2000 |
| WO | 0005277 A1 | 2/2000 |
| WO | 0105842 A1 | 1/2001 |
| WO | 2004024780 A1 | 3/2004 |
| WO | 2006019494 A1 | 2/2006 |
| WO | 2006028778 A2 | 3/2006 |
| WO | 2006056761 A1 | 6/2006 |
| WO | 2010027912 A1 | 3/2010 |
| WO | 2011097119 A1 | 8/2011 |
| WO | 2012141974 A1 | 10/2012 |

OTHER PUBLICATIONS

Foreign communication from the corresponding application International Application No. PCT/US2013/073054, International Search Report and Written Opinion, dated Mar. 6, 2014, 9 pages.
Michael Arne, SRI International, High Density Polyethylene, Supplement D, A private report by the Process Economics Program, May 1989.
J.P. Hogan et al., "Phillips Petroleum company Loop Reactor Polyethylene Technology," Journal of Applied Polymer Science Applied Polymer Symposium, 36, 49-60 (1981).
R.H. Perry & C.H. Chilton (Eds.). Chemical Engineers' Handbook (5th ed.). McGraw-Hill, Inc., New York, New York, pp. 5-46-5-47 (1973).
Magelli et al., "Solids Separation at the Exit of a Continuous-flow Slurry Reactor Stirred With Multiple Axial Impellers," Trans IChemE, vol. 75, Part A, Mar. 1997, 284-287.
Foreign communication from the corresponding application International Application No. PCT/US2011/036434, International Search Report and Written Opinion, dated Jul. 26, 2011, 11 pages.
Bibliographic data of U.S. Appl. No. 09/080,412 entitled "Continuous Slurry Polymerization Volatile Removal", filed May 18, 1998, Inventor: James Austin Kendrick.
Bibliographic data of U.S. Appl. No. 09/955,729 entitled "Continuous Slurry Polymerization Volatile Removal", filed Sep. 19, 2001, Inventor: James Austin Kendrick (98B014A13).
Bibliographic data of U.S. Appl. No. 09/586,370 entitled "High Solids Slurry Polymerization Apparatus", filed Jun. 2, 2000, Inventor: John Hottovy, et al.
Declaration of Scott T. Roger in a sealed envelope labeled as "Proprietary Information" under the provisions of MPEP §724.
Foreign communication from a related counterpart application—International Search Report & Written Opinion, PCT/US2018/012726, May 28, 2018, 9 pages.

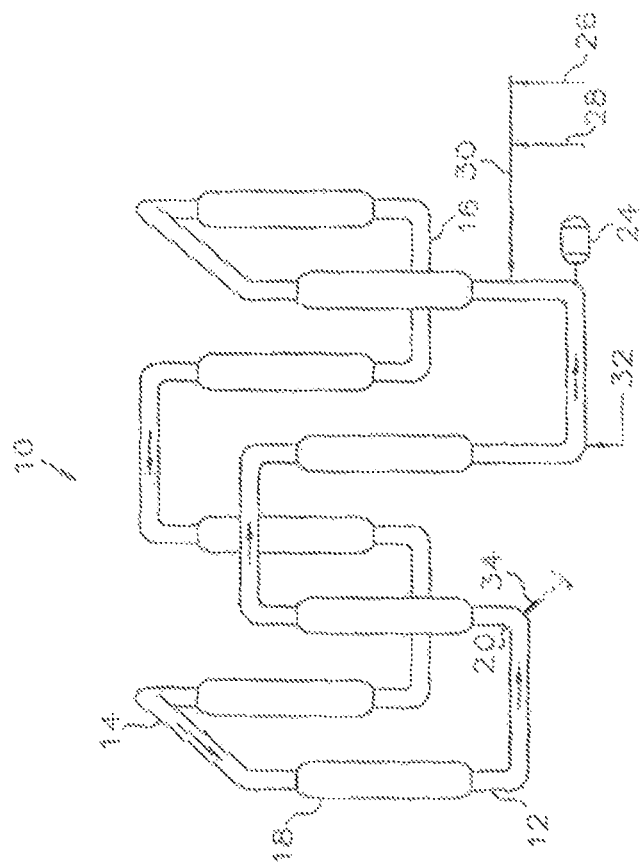

FLOW IN A SLURRY LOOP REACTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

The present invention generally relates to polymerization of olefin monomers.

Related Art

Polyolefins, such as polyethylene and polypropylene, may be prepared by particle form polymerization, also referred to as slurry polymerization. In such processes, feed materials, such as monomer and catalyst are introduced to a reactor (such as a loop reactor), and a product slurry containing solid polyolefin particles in the liquid medium is taken off.

In continuous loop reactors, the various feed materials may be introduced to the loop reactor in various ways. For example, the monomer and catalyst may be introduced separately or together, and the monomer and catalyst may be mixed with varying amounts of diluent prior to introduction to the reactor. Within the loop reactor, the monomer and catalyst become dispersed in the fluid slurry and as they circulate through the loop reactor, the monomer reacts at the catalyst site, thereby yielding solid polyolefin particles in the fluid slurry.

Properties of the polyolefin are influenced by a variety of factors, including reactor conditions. Work is continuously underway to improve operability of such reactions.

The present invention is directed to resolving, or at least reducing, one or all of the problems mentioned above.

SUMMARY

Various embodiments of the present invention include olefin polymerization processes. The processes generally include circulating a slurry including an olefin monomer selected from $C_2$-$C_{12}$ olefin monomers, a liquid diluent selected from $C_3$-$C_7$ alkanes, catalyst and polyolefin particles under polymerization conditions within a loop reactor, wherein, in operation, the process has a cavitation number (Ca) of from 6 to 60 and the polymerization conditions include a polymerization temperature of from 38° C. to 121° C. and a polymerization pressure of from 27 bar to 50 bar.

One or more embodiments include the process of the preceding paragraph, wherein the cavitation number (Ca) is from 12 to 50.

One or more embodiments include the process of any preceding paragraph, wherein the cavitation number (Ca) is from 18 to 40.

One or more embodiments include the process of any preceding paragraph, wherein the cavitation number (Ca) is from 24 to 36.

One or more embodiments include the process of any preceding paragraph and further including an average circulation velocity (v) of at least 7.0 m/s.

One or more embodiments include the process of any preceding paragraph and further including an average circulation velocity (v) of at least 10.7 m/s.

One or more embodiments include the process of any preceding paragraph and further including an average circulation velocity (v) of at least 12.2 m/s.

One or more embodiments include the process of any preceding paragraph, wherein the polymerization temperature is from 75° C. to 110° C.

One or more embodiments include the process of any preceding paragraph, wherein the slurry includes olefin monomer in a concentration of from 0.7 wt. % to 10.5 wt. %.

One or more embodiments include the process of any preceding paragraph, wherein the olefin monomer includes ethylene.

One or more embodiments include the process of any preceding paragraph, wherein the process has a Euler Number (Eu) of at least 5.

One or more embodiments include the process of any preceding paragraph, wherein the process has a length/diameter/Euler Number ratio (L/D/Eu) of less than 184.

One or more embodiments include the process of any preceding paragraph, wherein the process has a length/diameter/Euler Number ratio (L/D/Eu) of less than 184.

One or more embodiments include the process of any preceding paragraph, wherein the slurry includes greater than 48 wt. % polyolefin particles.

One or more embodiments include the process of any preceding paragraph, wherein the slurry includes greater than 48 wt. % polyolefin particles.

In one or more embodiments, the polymerization process includes circulating a slurry including olefin monomer, liquid diluent, catalyst and polyolefin particles under polymerization conditions within a loop reactor, wherein, in operation, the process has a Euler Number (Eu) of at least 5.

One or more embodiments include the process of the preceding paragraph, wherein the Euler number (Eu) is at least 6.

One or more embodiments include the process of any preceding paragraph, wherein the Euler number (Eu) is at least 7.

One or more embodiments include the process of any preceding paragraph and further including a length/diameter/Euler Number ratio (L/D/Eu) of less than 184.

One or more embodiments include the process of any preceding paragraph and further including a length/diameter/Euler Number ratio (L/D/Eu) of less than 180.

One or more embodiments include the process of any preceding paragraph and further including a length/diameter/Euler Number ratio (L/D/Eu) of less than 175.

One or more embodiments include the process of any preceding paragraph and further including a length/diameter/Euler Number ratio (L/D/Eu) of less than 170.

One or more embodiments include the process of any preceding paragraph, wherein the slurry includes greater than 48 wt. % polyolefin particles.

One or more embodiments include the process of any preceding paragraph, wherein the slurry includes greater than 50 wt. % polyolefin particles.

One or more embodiments include the process of any preceding paragraph, wherein the slurry includes greater than 52 wt. % polyolefin particles.

One or more embodiments include the process of any preceding paragraph and further including a length/diameter/Euler Number ratio (L/D/Eu) of less than 184 and wherein the slurry includes greater than 48 wt. % polyolefin particles.

The above paragraphs present a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The following FIGURES form part of the present specification and are included to further demonstrate certain aspects of the present invention. The claimed subject matter may be understood by reference to the following description taken in conjunction with the accompanying drawings, in which like reference numerals identify like elements, and in which:

The drawing illustrates an exemplary embodiment of a loop reactor system.

While the claimed subject matter is susceptible to various modifications and alternative forms, the drawings illustrate specific embodiments herein described in detail by way of example. It should be understood, however, that the description herein of specific embodiments is not intended to limit the claimed subject matter to the particular forms disclosed, but on the contrary, the intention is to cover all modifications, equivalents, and alternatives failing within the spirit and scope of the invention as defined by the appended claims.

DETAILED DESCRIPTION illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the description below, unless otherwise specified, all compounds described herein may be substituted or unsubstituted and the listing of compounds includes derivatives thereof. Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

In the specification and appended claims, the terms "connect", "connection", "connected", "in connection with" and "connecting" are used to mean "in direct connection with" or "in connection with via another element", and the term "set" is used to mean "one element" or "more than one element". As used herein, the terms "up" and "down", "upper" and "lower", "upwardly" and "downwardly", "upstream" and "downstream", "above" and "below" and other like terms indicating relative positions above or below a given point or element are used in this description to more clearly describe some embodiments of the invention. However, when applied to equipment and methods for use in wells that are deviated or horizontal, such terms may refer to a left to right, right to left or other relationship as appropriate.

Embodiments described herein include processes of forming polyolefins (i.e., olefin polymerization processes). As known in the art, olefin polymerization processes include contacting an olefin monomer with a catalyst within a reaction zone to form a polyolefin.

The olefin monomers utilized in the processes described herein may be selected from $C_2$ to $C_{30}$ olefin monomers, or $C_2$ to $C_{12}$ olefin monomers (e.g., ethylene, propylene, 1-butene, pentene, 4-methyl-1-pentene, 1-hexene, 1-octene and 1-decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polyolefin may include homopolymers, copolymers or terpolymers, for example. In one or more embodiments, the olefin monomers are selected from $C_2$-$C_3$ olefin monomers. In other embodiments, the olefin monomer includes ethylene.

In one or more embodiments, the processes described herein include the homopolymerization of ethylene. In alternative embodiments, the processes described herein include the copolymerization of ethylene and a higher 1-olefin, such as 1-butene, 1-pentene, 1-hexene, 1-octene or 1-decene, for example. For example, the process may include the copolymerization of ethylene and a starting amount of comonomer ranging from about 0.01 wt. % to about 10 wt. %, or from about 0.01 wt. % to about 5 wt. %, or from about 0.1 wt. % to about 4 wt. % (wherein the resulting copolymers may still be referred to as polyethylene).

Catalysts may include any catalyst(s) or catalyst system(s) useful for polymerizing olefin monomers. For example, the catalyst may be selected from chromium based catalyst systems, single site transition metal catalyst systems including both single and multiple (two or more) metallocene catalyst systems, Ziegler-Natta catalyst systems and combinations thereof, for example. As known in the art, the catalysts may be activated for subsequent polymerization and may or may not be associated with a support material, for example.

Once the catalyst is prepared, as described above and/or as known to one skilled in the art, a variety of olefin polymerization processes may be carried out using that catalyst. The polymerization conditions (e.g., equipment, process conditions, reactants, additives and other materials used in polymerization processes) will vary in a given process, depending on the desired composition and properties of the polyolefin being formed. Such processes may include solution phase, gas phase, slurry phase, bulk phase, high pressure processes or combinations thereof, for example.

Slurry phase processes (also referred to as particle form polymerization) generally include forming a suspension of solid, particulate polymer in a liquid polymerization medium, to which monomers and optionally hydrogen, along with catalyst, are added. The suspension (which may include diluents) may be intermittently or continuously removed from the reaction zone, where the volatile components can be separated from the polymer and recycled, optionally after a distillation, to the reaction zone. Liquefied diluent may optionally be employed in the polymerization medium and may be a diluent for the solid polymer particles that is separate from and in addition to the unreacted monomers. Suitable diluents included those known in the art and include hydrocarbons which are inert and liquid or are super critical fluids under slurry polymerization conditions. For example, suitable diluents may include $C_3$-$C_7$ alkanes, such as isobutane, propane, n-pentane, i-pentane, neopentane, n-hexane and n-heptane. In one or more embodiments, the diluent includes isopentane (i-pentane). In further embodiments, the diluent includes isobutane. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, the polymerization process may be carried out continuously in one or more loop reactors. In continuous loop reactors, feed materials, such as monomer and catalyst are introduced to the reactor and a product slurry containing solid polyolefin particles in the liquid medium is taken off. In continuous loop reactors, the various feed materials may be introduced to the loop reaction zone in various ways. For example, the monomer and catalyst may be introduced separately or together and the monomer and catalyst may be mixed with varying amounts of diluent prior to introduction to the reaction zone. In the loop reaction zone, the monomer and catalyst become dispersed in the fluid slurry. As they circulate through the loop reaction zone in the fluid slurry, the monomer reacts at the catalyst site in a polymerization reaction and the polymerization reaction yields solid polyolefin particles in the fluid slurry.

In one or more embodiments, the slurry may include olefin monomer in a concentration of greater than about 4 wt. %, or greater than about 5 wt. %, or from about 0.7 wt. % wt. % to about 10.5 wt. %, or from about 5 wt. % to about 8 wt. %, for example. In one or more embodiments, the slurry may include greater than about 48 wt. %, or greater than about 50 wt. %, or greater than about 52 wt. % polyolefin particles (i.e., solids), for example. As used herein, reference to slurry composition refers to a point in time in the polymerization wherein steady state conditions have been achieved.

The loop reactor may be maintained at a pressure of from about 27 bar to about 50 bar or from about 35 bar to about 45 bar and a temperature of from about 38° C. (100° F.) to about 121° C. (250° F.), or from about 75° C. (167° F.) to about 110° C. (230° F.), or less than about 103° C. (217° F.), for example. Depending on the selection of diluent, monomer and optional comonomer, the reactor may also be operated at super-critical conditions. Reaction heat may be removed through the loop wall via any suitable method, such as via a double-jacketed pipe or heat exchanger, for example. Additional details regarding loop reactor apparatus and polymerization processes may be found, for example, in U.S. Pat. No. 4,674,290, U.S. Pat. No. 5,183,866, U.S. Pat. No. 5,455,314, U.S. Pat. No. 5,565,174, U.S. Pat. No. 6,045,661, U.S. Pat. No. 6,051,631, U.S. Pat. No. 6,114,501, and U.S. Pat. No. 6,262,191, the contents of which are incorporated in their entirety herein.

In operation, it is important to maintain suspension within loop slurry reactors. If suspension of the solids within the liquid is not maintained, solid particles can settle at locations within the reactor, thereby causing plugging. Accordingly, slurry phase processes generally utilize one or more pumps to provide motive force for circulation of the fluid slurry. Such pumps generally circulate the fluid slurry at a circulation velocity. The pumps may include those known in the art capable of providing operation within the operating specifications described herein and include for example those described in U.S. Pat. No. 8,354,063, U.S. Pat. No. 7,736,597, and U.S. Pat. No. 7,014,821, the contents of all of which are incorporated by reference in their entirety herein.

Maintaining the suspension can be accomplished by operating the loop slurry reactor at or above a minimum average circulation velocity. In one or more embodiments, the minimum average circulation velocity is maintained at a level higher than in typical polymerization processes. For example, the minimum average circulation velocity may, in one or more embodiments, be at least 7.0 m/s, or at least 10.7 m/s, or at least 12.2 m/s, or at least 13.7 m/s, for example. However, in other embodiments, such as those having small diameter (about 6 inches, for example) loop reactor pipes, the minimum average circulation velocity may be as low as about 3 m/s, or 4 m/s, or 5 m/s, for example. The circulation velocity in the reactor is calculated from the reactor volume flow divided by the cross-sectional area of the reactor pipe section. It is recognized that the localized velocity of the slurry at a given location in the loop reactor may vary slightly and have a profile that is generally slower at the loop reactor wall than in the central area of the loop reactor. However, reference to the minimum circulation velocity means that the localized slurry velocity is the same or greater than the identified minimum average circulation velocity.

One method of maintaining the specified minimum circulation velocity is to operate the loop reactor at a reactor pressure above the suction pressure required to provide Net Positive Suction Head (NPSH) to the one or more pumps as measured by the manufacturer. However, it has been demonstrated that operating at or below such pressures can result in erosion damage to the loop reactor pumps (e.g., as a result of cavitation). In addition, increased slurry velocities can require more power supplied by the pump motor, higher head, and more shaft, bearing, seal and impeller strength.

Cavitation refers to the formation of vapor cavities, such as bubbles or voids, formed within a liquid, which can lead to significant wear within a reactor system, including surface fatigue of metal components therein. It is defined as the process of formation of the vapor phase of a liquid (vapor bubbles) when it is subjected to reduced pressures at constant temperature. Further, cavitation can cause noise, damage to components, vibrations and loss of efficiency in pumps, as well as mechanical seal damage in loop slurry reactors, for example. Accordingly, polymerization processes tend to operate at conditions that avoid cavitation.

The degree of cavitation can be estimated with the aid of a non-dimensional parameter typically referred as Cavitation number (Ca), conventionally represented as a. Cavitation number (Ca) is useful analyzing or characterizing fluid flow dynamics where cavitation may occur. Cavitation number (Ca) expresses the relationship between the difference of a local absolute pressure and the vapor pressure and the kinetic energy per volume and is used to characterize the potential of the flow to cavitate (i.e., the lower the number the increased likelihood that the flow is to cavitate). Dimensionless numbers are often defined as products or ratios of quantities that are not dimensionless, but whose dimensions cancel out when their powers are multiplied. One of skill in the art would understand, particularly in light of the present disclosure, that the measured parameters used to calculate the dimensionless numbers referenced herein must be converted to like or consistent units before making the calculation such that the units cancel each other out to result in the dimensionless number.

The Cavitation number is defined by the following equation (1):

$$Ca = \frac{P_r - P_v}{0.5\rho V^2} \quad (1)$$

where $\rho$ is the density of the fluid slurry as measured in units known to one skilled in the art, such as, for example, kg/m³, $P_r$ is the local pressure (or ambient, absolute pressure) as measured in units known to one skilled in the art, such as, for example, Pa (Pascals), $P_v$ is the vapor pressure of the fluid slurry as measured in units known to one skilled in the art, such as, for example, Pa, and V is a characteristic velocity of the flow (i.e., the circulation velocity) as measured in units known to one skilled in the art, such as, for example, m/s.

In one or more embodiments of the invention, the polymerization process has a control cavitation number of less than 35.7. Alternative embodiments include control cavitation numbers of less than 30, or less than 20, or less than 10, or from 6 to 60, or from 12 to 50, or from 18-40, or from 24-36, for example. As used herein, the term "control cavitation number" refers to upper limit of the cavitation number at any point throughout the process. In another embodiment, the polymerization process has an average cavitation number of less than 35.7. Alternative embodiments include average cavitation numbers of less than 30, or less than 20, or less than 10, or in the range from 6 to 60, or from 12 to 50, or from 18-40, or from 24-36, for example.

Euler number is also a dimensionless number used in fluid flow calculations. It expresses the relationship between a local pressure drop (i.e., pressure differential) and the kinetic energy per volume and is used to characterize losses in flow, where a perfect frictionless flow corresponds to a Euler number of 1. The Euler number is defined by the following equation (2):

$$Eu = \frac{\Delta P}{\rho V^2} \quad (2)$$

where $\rho$ is the density of the fluid slurry as measured in units known to one skilled in the art, such as, for example, kg/m³, $\Delta P$ is the difference between the upstream pressure and the downstream pressure measured in units known to one skilled in the art, such as, for example, Pa, and V is a characteristic velocity of the flow (i.e., circulation velocity) as measured in units known to one skilled in the art, such as, for example, m/s. While those of skill in the art may utilize the Euler number to characterize fluid flow characteristics, others may use the Ruark number (designated by the symbol Ru), which is the reciprocal of the Euler number.

One or more embodiments include polymerization processes having a Euler Number of at least 5, or at least 6, or at least 7, for example.

Further, one or more embodiments include a length/diameter/Euler Number ratio (L/D/Eu) of less than 184, or less than 180, or less than 175, or less than 170, for example. As used herein, "length" is defined as flow length (described subsequently herein) and "diameter" is defined as internal diameter (described subsequently herein).

The above recited conditions can be met via a variety of process operation configurations. For example, the conditions may be met through reactor configuration, such as the direction and radius of elbows and direction and length of horizontal sections, operating conditions, such as pressure and temperature, as discussed herein, and diluent selection.

Upon removal from the reactor, the polyolefin may be passed to a polymer recovery system for further processing, such as the addition of additives and/or extrusion. Such recovery systems are known to one skilled in the art and therefore are not described in detail herein.

The polyolefins (and blends thereof) formed via the processes described herein may include, but are not limited to, linear low density polyethylene (LLDPE), low density linear polyethylene (LDLPE), elastomers, plastomers, high density polyethylenes (HDPE), low density polyethylenes (LDPE), medium density polyethylenes (MDPE), polypropylene and polypropylene copolymers.

In one or more embodiments, the formed polyolefin may include polyethylene having a density (as measured by ASTM D-792) of from about 0.86 g/cc to about 0.98 g/cc, or from about 0.88 g/cc to about 0.965 g/cc, or from about 0.90 g/cc to about 0.965 g/cc or from about 0.925 g/cc to about 0.97 g/cc.

In one or more embodiments, the formed polyolefin may include high density polyethylene. As used herein, the term "high density polyethylene" refers to ethylene based polymers having a density of from about 0.94 g/cc to about 0.97 g/cc.

In one or more embodiments, the formed polyolefin may include low density polyethylene. As used herein, the term "low density polyethylene" refers to ethylene based polymers having a density of less than about 0.92 g/cc.

The polyolefins and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

The drawing illustrates a loop reactor (or loop reaction zone) 10 having vertical segments 12, upper horizontal segments 14 and lower horizontal segments 16. These upper and lower horizontal segments 14 and 16 define upper and lower zones of horizontal flow. An impeller (not shown), driven by motor 24, is located in the loop reactor 10 to circulate the slurry. Each vertical segment 12 is connected to another vertical segment through a corresponding horizontal segment (14 or 16). The vertical segment 12 may include heat exchange jackets (or cooling jackets) 18. The vertical segments 12 and horizontal segments 14 and 16 define a loop reaction zone. The loop reaction zone 10 may include more or fewer vertical segments 12 and corresponding horizontal segments 14 and 16 than shown in the drawing. Further, the loop reaction zone 10 may be oriented vertically or horizontally. Additionally, some or all of the horizontal segments 14 and 16 may be curved members that connect vertical segments 12. The connecting segments 14 and 16 may be any shape or form that connects the vertical segments 12 and allows fluid to flow there between. In some configurations, the vertical segments 12 may be connected with a U-shaped segment (not shown) rather than horizontal segments 14 and 16, as shown.

In the drawing olefin monomer and make up diluent are introduced via lines 26 and 28, respectively, which can enter the loop reactor 10 directly at one or a plurality of locations or can combine with condensed diluent recycle line 30, as shown. Comonomer may also be introduced to the loop reactor 10 by these lines. The monomer and comonomer may be fed to the loop reactor 10 by any suitable techniques, such as a simple opening to the reactor, a nozzle, a sparger, or other distribution apparatus, for example.

Catalyst may be introduced to loop reactor 10 via catalyst introduction means 32 that provides a zone (location) for catalyst introduction. Any suitable means of introducing catalyst to the loop reactor may be employed. For example, the process and apparatus disclosed in U.S. Pat. No. 6,262, 191, which is incorporated by reference herein, for preparing a catalyst and providing to a loop reaction zone may be utilized.

The elongated hollow appendage for continuously taking off an intermediate product slurry from the loop reactor 10 is designated broadly by reference to character 34. Continuous take off mechanism 34 may be located in or adjacent to a downstream end of one of the lower horizontal segments 16 and adjacent or on a connecting elbow 20. The loop reactor 10 can have one or more continuous take off appendages. It is to be recognized that although depicted as continuous take off mechanisms 34 in the particular embodiments illustrated in the drawing, it is contemplated that settling legs may be used as an alternative or in combination with the continuous take off mechanisms, as known to one skilled in the art.

Any number of vertical segments 12 or "legs" can be employed, although the drawing depicts eight legs. For example, a six-leg reactor may be utilized or a twelve-leg reactor may be utilized. The flow length of the loop reaction zone may be greater than 900 feet, or greater than 1000 feet, or greater than 1100 feet, or greater than 1200 feet, or greater than 1300 feet, or greater than 1400 feet, or greater than 1500 feet or greater than 1.600 feet, or greater than 1700 feet, or greater than 1800 feet, or greater than 1900 feet, or greater than 2000 feet. The foregoing lengths may be approximate in some situations. As utilized herein, the term "flow length" refers to the total length of the path that it takes for the slurry to circulate through the loop reactor one time.

In one or more embodiments, each vertical section 12 and each horizontal section 14 and 16 have substantially equal diameters. As used herein, the term "diameter" refers to the internal diameter of the pipe of the loop reactor. In one or more embodiments, the diameter is from 0.25 m to 1.0 m, or from 0.30 m to 0.8 m, or from 0.35 m to 0.76 m, for example.

The loop reactor 10 may be operated so as to generate a pressure differential of at least 18 psig, or at least 20 psig, or at least 22 psig, or at least 24 psig, or at least 26, psig, or at least 28 psig, or at least 30 psig, for example. As used herein, the term "pressure differential" refers to the difference between an upstream and downstream end of one or more pumps utilized to circulate the slurry.

To further illustrate correlation of reactor conditions, cavitation and Euler Number, sample calculations are included below for a theoretical ethylene polymerization process carried out in isobutane in a loop reactor with eight vertical legs.

TABLE 1

Cavitation calculations

| $T_R$ (°F.) | $C_2$ (wt. %) | $P_r$ (Pa) | $P_v$ (Pa) | $\rho$ (kg/m³) | V (m/s) | Ca |
|---|---|---|---|---|---|---|
| 217 | 4.9 | 4240276 | 2895798 | 567.1 | 11.5 | 35.7 |
| 225 | 2.5 | 4240276 | 2757903 | 575.1 | 10.7 | 45.3 |
| 225 | 4.3 | 4240276 | 2964746 | 568.7 | 10.7 | 39.4 |
| 175 | 5.5 | 4240276 | 2068427 | 549.5 | 10.7 | 69.5 |
| 220 | 8.0 | 4240276 | 3378431 | 554.3 | 10.7 | 27.3 |
| 220 | 8.0 | 4240276 | 3378431 | 554.3 | 12.2 | 20.9 |
| 220 | 8.0 | 4240276 | 3378431 | 554.3 | 13.7 | 16.5 |
| 217 | 4.9 | 4240276 | 2895798 | 567.1 | 12.2 | 31.9 |
| 200 | 4.0 | 4240276 | 2344217 | 570.3 | 13.7 | 35.3 |
| 200 | 8.0 | 4481592 | 3378431 | 554.3 | 13.7 | 21.2 |
| 200 | 4.0 | 4240276 | 2344217 | 570.3 | 15.2 | 28.6 |
| 200 | 8.0 | 4481592 | 3378431 | 554.3 | 15.2 | 17.1 |
| 217 | 4.9 | 4240276 | 2895798 | 567.1 | 15.2 | 20.4 |

As shown in Table 1, as the circulation velocity (V) increases, the cavitation number (Ca) decreases. Such lower cavitation numbers further allow for decreased reactor temperatures ($T_R$) and increased ethylene ($C_2$) concentrations within the reactor during operation.

TABLE 2

Euler Number calculations

| Solids (wt. %) | ΔP (Pa) | ρ (kg/m³) | V (m/s) | Eu | Ru | L (m) | D (m) | L/D | L/D/Eu |
|---|---|---|---|---|---|---|---|---|---|
| 39 | 98595.03 | 534 | 10.0 | 1.85 | 0.54 | 286.5 | 0.56 | 511.6 | 246.9 |
| 45 | 154442.6 | 558 | 11.8 | 1.99 | 0.50 | 286.5 | 0.56 | 511.6 | 257.2 |
| 53 | 163405.7 | 592 | 11.5 | 2.08 | 0.48 | 286.5 | 0.56 | 511.6 | 246.0 |
| 48 | 313022.0 | 564 | 10.8 | 4.79 | 0.21 | 496.2 | 0.56 | 886.1 | 184.8 |
| 48 | 327501.0 | 564 | 11.0 | 4.80 | 0.21 | 496.2 | 0.56 | 886.1 | 184.7 |
| 48 | 341979.9 | 564 | 11.3 | 4.77 | 0.21 | 496.2 | 0.56 | 886.1 | 185.9 |
| 48 | 357148.4 | 564 | 11.5 | 4.77 | 0.21 | 496.2 | 0.56 | 886.1 | 185.7 |
| 48 | 372316.9 | 564 | 11.8 | 4.77 | 0.21 | 496.2 | 0.56 | 886.1 | 185.8 |
| 52 | 481943.5 | 588 | 10.7 | 7.20 | 0.14 | 708.7 | 0.56 | 1265.5 | 175.7 |
| 50 | 499869.9 | 588 | 10.7 | 7.47 | 0.13 | 708.7 | 0.56 | 1265.5 | 169.4 |

As shown in Table 2, as the Euler Number increases, higher solids contents within the reactor can be achieved.

As illustrated herein, embodiments of the invention provide adequate (and in instances, improved) operation to polymerization processes at cavitation numbers that are lower than previously recognized. In fact, embodiments of the invention provide for polymerization process operability at cavitation numbers that may approach cavitation. Further, such processes including lower cavitation numbers are capable of operation without significantly increase reactor pressures, thereby avoiding or minimizing the increased costs usually associated with decreased cavitation numbers.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present invention.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. An olefin polymerization process comprising:
   circulating a slurry comprising an olefin monomer selected from $C_2$-$C_{12}$ olefin monomers, a liquid diluent selected from $C_3$-$C_7$ alkanes, catalyst and polyolefin particles under polymerization conditions within a loop reactor, wherein, in operation, the process has a cavitation number of from 6 to 60 and the polymerization conditions comprise a polymerization temperature of from 38° C. to 121° C. and a polymerization pressure of from 27 bar to 50 bar.

2. The process of claim 1, wherein the cavitation number (Ca) is from 12 to 50.

3. The process of claim 1, wherein the cavitation number (Ca) is from 18 to 40.

4. The process of claim 1, wherein the cavitation number (Ca) is from 24 to 36.

5. The process of claim 1 further comprising an average circulation velocity (v) of at least 7.0 m/s.

6. The process of claim 1 further comprising an average circulation velocity (v) of at least 10.7 m/s.

7. The process of claim 1 further comprising an average circulation velocity (v) of at least 12.2 m/s.

8. The process of claim 1, wherein the polymerization temperature is from 75° C. to 110° C.

9. The process of claim 1, wherein the slurry comprises olefin monomer in a concentration of from 0.7 wt. % to 10.5 wt. %.

10. The process of claim 1, wherein the olefin monomer comprises ethylene.

11. The process of claim 1, wherein the process has a Euler Number (Eu) of at least 5.

12. The process of claim 1, wherein the process has a length/diameter/Euler Number ratio (L/D/Eu) of less than 184.

13. The process of claim 11, wherein the process has a length/diameter/Euler Number ratio (L/D/Eu) of less than 184.

14. The process of claim 1, wherein the slurry comprises greater than 48 wt. % polyolefin particles.

15. The process of claim 13, wherein the slurry comprises greater than 48 wt. % polyolefin particles.

16. An olefin polymerization process comprising:
   circulating a slurry comprising olefin monomer, liquid diluent, catalyst and polyolefin particles under polymerization conditions within a loop reactor, wherein, in operation, the process has a Euler Number (Eu) of at least 5.

17. The process of claim 16, wherein the Euler number (Eu) is at least 6.

18. The process of claim 16, wherein the Euler number (Eu) is at least 7.

19. The process of claim 16 further comprising a length/diameter/Euler Number ratio (L/D/Eu) of less than 184.

20. The process of claim 16 further comprising a length/diameter/Euler Number ratio (L/D/Eu) of less than 180.

21. The process of claim 16 further comprising a length/diameter/Euler Number ratio (L/D/Eu) of less than 175.

22. The process of claim 16 further comprising a length/diameter/Euler Number ratio (L/D/Eu) of less than 170.

23. The process of claim 16, wherein the slurry comprises greater than 48 wt. % polyolefin particles.

24. The process of claim 16, wherein the slurry comprises greater than 50 wt. % polyolefin particles.

25. The process of claim 16, wherein the slurry comprises greater than 52 wt. % polyolefin particles.

26. The process of claim 16 further comprising a length/diameter/Euler Number ratio (L/D/Eu) of less than 184 and wherein the slurry comprises greater than 48 wt. % polyolefin particles.

* * * * *